(12) United States Patent
Narahara et al.

(10) Patent No.: US 6,262,950 B1
(45) Date of Patent: Jul. 17, 2001

(54) OPTICAL DISC RECORDING METHOD AND ACCESS METHOD, OPTICAL DISC, OPTICAL DISC RECORDING APPARATUS, AND OPTICAL DISC APPARATUS

(75) Inventors: Tatsuya Narahara; Shoei Kobayashi, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/173,315

(22) Filed: Oct. 15, 1998

(30) Foreign Application Priority Data

Oct. 17, 1997 (JP) .................................................. 9-285900

(51) Int. Cl.$^7$ .................................................. G11B 17/22
(52) U.S. Cl. .......................................... 369/32; 369/59.23
(58) Field of Search .......................... 369/32, 33, 59.23, 369/59.24, 59.19, 47.19; 360/40, 41, 48, 49

(56) References Cited

U.S. PATENT DOCUMENTS

| | | | |
|---|---|---|---|
| 5,524,103 | * | 6/1996 | Shimizu et al. ..................... 369/59 |
| 5,535,187 | * | 7/1996 | Melas et al. ......................... 369/59 |
| 5,541,960 | * | 7/1996 | Satomura et al. ................ 375/368 |
| 5,604,725 | * | 2/1997 | Fuji .................................. 369/275.3 |
| 5,623,477 | * | 4/1997 | Shimada et al. ................ 369/275.3 |
| 5,689,488 | * | 11/1997 | Yamaguchi .......................... 369/59 |
| 5,864,531 | * | 1/1999 | Horigome .......................... 369/124 |
| 6,072,756 | * | 6/2000 | Shigenobu .......................... 369/47 |
| 6,091,700 | * | 7/2000 | Kobayashi et al. ............ 369/275.4 |
| 6,125,100 | * | 9/2000 | Sensyu ............................ 369/275.3 |

FOREIGN PATENT DOCUMENTS 0 319 441 A2 * 7/1989 (EP) .
2-141975 * 5/1990 (JP) .

* cited by examiner

*Primary Examiner*—Tan Dinh
(74) *Attorney, Agent, or Firm*—Frommer Lawrence & Haug, LLP.; William S. Frommer

(57) ABSTRACT

The present invention provides an optical disc recording method and an optical disc recording apparatus for an optical disc of a high-density recording whose master can be subjected cutting with a high yield. The present invention also provides an optical disc access method and an optical disc apparatus capable of a high-density recording as well as an easy access.

An address signal generating circuit 5 generates an address signal indicating an address data as a code having a minimum run length longer than a minimum run length of a modulated code based on a predetermined modulation rule of a user data recorded/reproduced via a recording/reproduction area. The address signal is recorded by an optical head 4 in a reproduction-dedicated area of a master disc 1.

18 Claims, 8 Drawing Sheets

OPTICAL DISC RECORDING METHOD AND ACCESS METHOD, OPTICAL DISC, OPTICAL DISC RECORDING APPARATUS, AND OPTICAL DISC APPARATUS

BACKGROUND OF THE INVENTION

1. Field of the Invention

The present invention relates to an optical disc recording method and access method, an optical disc, an optical disc recording apparatus and an optical disc apparatus.

2. Description of Prior Art

Conventionally, optical recording media such as a disc-shaped optical recording medium and a card-shaped optical recording medium have been developed and now available in market for utilizing an optical or magneto-optical signal recording/reproduction method. These optical recording medium include a so-called compact disc (CD), i.e., a read only memory (ROM) type recording media, and a so-called write once type (writable enabling a user to write a data once as well as a magneto-optical disc enabling a data rewrite (so-called overwrite).

An optical disc recording/reproducing apparatus for writing and reading out a data onto/from a disc-shaped optical recording medium includes a built-in laser diode for emitting a laser beam for recording/reproducing an information and a built-in photo detector for detecting a reflected light of the laser beam applied to an optical disc. According to the detection output from the photo detector, a focus servo and a tracking servo is executed to an optical head. The optical disc is rotated at a constant angular velocity or at a constant linear velocity by a spindle motor so that the optical head scans a record track on the optical disc with the laser beam, thus recording/reproducing a data onto/from the optical disc.

On the other hand, these years, a high capacity is realized in an optical recording medium such as a ROM (read only memory) disc and RAM (random access memory) disc. The semiconductor laser used for the optical head of the optical disc recording/reproducing apparatus is required to have a shorter wavelength and the objective lens for focusing the laser beam on the information record plane of the optical disc is required to have a high numerical aperture (NA).

In order to implement a high-density phase change type optical disc having a greater capacity than a DVD-RAM, there is known a technique to minimize the spot size. The spot size on the recording medium is generally given as λ/NA, which can be reduced by a technique to use a short wavelength laser source such as GaN and ZnSe and a technique to increase the objective lens NA by use of two-lense configuration such as a solid immersion lens (SIL).

For example, if λ=640 nm and NA=0.85, the spot diameter on the medium is about 0.75 mm. In this case, if a signal is recorded or reproduced using RLL (1, 7) modulation for example, it ispossible to obtain a recording density of about 0.21 mm/bit.

Moreover, it is preferable to suppress a DC component of recording/reproducing signal in an optical disc system. Especially when removing PR for a high-density recording/reproduction, it is necessary to suppress the DC component as much as possible Furthermore, in an optical disc system using an optical head having an objective lens of high NA, it is necessary to increase an error correction efficiency in order to suppress errors caused by dust and scars on the disc surface affecting the laser beam. In order to enhance the error correction efficiency, the code size is increased and the ECC block size is increased. Furthermore, there is a method of interleaving an error correction code into a block so as to spread an ECC block into one track on the inner circumference of the disc.

In this case also, access efficiency should be secured and a pre-address or the like is required more than a certain level.

In general, an address information for accessing an optical disc is recorded in advance in an address block provided as a reproduction-dedicated area in a head portion of a user data block where a user data is recorded/reproduced as a modulation code according to a predetermined modulation rule. The modulation code of the address information recorded in the aforementioned reproduction-dedicated area has been a modulation code of the same method as the user data recorded in the recording/reproduction area so as to simplify the reproduction system.

As a representative modulation method having a wide channel detection window which is appropriate for carrying out a high-density recording and reproduction, the RLL (1, 7) code and RLL (2, 7) code are known.

The RLL (1, 7) modulation is a modulation in which a pit information (symbol) 0 has the minimum run of 1 and the maximum run of 7, and the maximum reverse interval of a waveform sequence is based on the run length limited (RLL) code.

Here, in the RLL (1, 7) modulation, a data having a basic data length of m bits is converted into a variable length code (d, k; , m, n; r) as follows. For example, using a conversion table containing a code limiting a predetermined time of succession of the minimum run d of 0 of the channel bit string of the RLL (1, 7) code, a data having a basic data length m of 2 bits for example is converted into a variable length code (1, 7; 2, 3; 2) having the 0 minimum run d of 1 bit, the 0 maximum run k of 7 bits, the basic data length m of 2 bits, the basic code length n of 3 bits, and the maximum constriction length r of 2. This RLL (1, 7) modulation is carried out, for example, using a conversion table as follows. RLL (1,7;2,3;2)

|  | Data | Code | |
|---|---|---|---|
| i = 1 | 11 | 00x | |
|  | 10 | 010 | |
|  | 01 | 10x | |
| i = 2 | 0011 | 000 | 00x |
|  | 0010 | 000 | 010 |
|  | 0001 | 100 | 00x |
|  | 0000 | 100 | 001 |

In this RLL (1, 7) modulation, if the recording waveform sequence bit interval is assumed to be T, the minimum reverse interval Tmin is 2T. Moreover, if the data string bit interval is assumed to be Tdata, this minimum reverse interval Tmin is 1.33 (=(m/n)×Tmin=(⅔)=2) Tdata. Moreover, the maximum reverse interval Tmax is 8(=7+1)T (=(m/n)×Tmax) Tdata (⅔)=8 Tdata=5.33 Tdata). Furthermore, the detection window Tw is 0.67 (=⅔) Tdata.

Moreover, in the RLL (2, 7) modulation, a data having a basic data length of m in length code (d, k; m, n; r) is carried out as follows. For example, using a conversion table containing a code for limiting a predetermined number of time of succession of the 0 minimum run d of the channel bit string of the RLL (2–7) code, a data having a basic data length m of 2 is converted into a variable length code (1, 7; 2, 3; 3) having 0 minimum run d of 2 bits, the 0 maximum run k of 7 bits, the basic data length m of 1 bits, the basic code length n of 3 bits, and the maximum restriction length r of 2. This RLL (2, 7) modulation is carried out, for example, by using a conversion table as follows. RLL (2,7; 1, 3; 2)

|       | Data |    | Code |      |
|-------|------|----|------|------|
| i = 1 | 11   | 10 | 00   |      |
|       | 10   | 01 | 00   |      |
| i = 2 | 011  | 00 | 10   | 00   |
|       | 010  | 10 | 01   | 00   |
|       | 000  | 00 | 01   | 00   |
| i = 3 | 0011 | 00 | 00   | 1000 |
|       | 0010 | 00 | 10   | 0100 |

In this RLL (2, 7) modulation, if the recording waveform sequence bit interval is assumed to be T, the minimum reverse interval Tmin (=(d+1) T) is 3R. Moreover, if the data string bit interval is assumed to be Tdata, the minimum reverse interval Tmin is $1.5(=(m/n)\times Tmin=(\frac{1}{2})\times 3)$ Tdata. Moreover, the maximum reverse interval Tmax (=(k+1)T) is 8 (=7+1)T (=(m/n)×Tmax) Tdata=($\frac{1}{2}$)=8 Tdata =4.0 Tdata). Furthermore, the detection window Tw (=(m/n)×T) is 0.5 (=$\frac{1}{2}$) Tdata.

On the other hand, in a magnetic field modulation magneto-optical recording method, as the minimum run length signal level approaches 0, line density is increased and for detection with he most likelihood decoding, because of the short minimum mark length, it has been difficult to form a high-quality pit in preparing an original recording disc by way of exposure. Moreover, in a phase change type and a magneto-optical type light intensity modulation recording where a land/groove recording of a high density is to be carried out, it has been difficult to obtain both of a fine groove width control and a short mark length formation.

For this, if the address block recording wavelength is increased, the channel clock frequency is difference between the address block and the user data block. Accordingly, it becomes necessary to provide a plurality of clock synchronization circuits for processing each of the signals separately or to provide a long pull-in portion for pulling into a difference frequency. This complicates a reproduction system as well as decreases the optical disc capacity.

SUMMARY OF THE INVENTION

It is therefore an object of the present invention to provide an optical disc recording method and an optical disc recording apparatus enabling to carry out a cutting an original optical disc for a high-density recording with a high yield.

Another object of the present invention is to provide an optical disc and an optical disc apparatus capable of simplifying a configuration of clcok reproduction eans in a reproduction system.

Still another object of the present invention is to provide an optical disc access method and an optical disc apparatus capable of a high-density recording as well as enabling an easy access.

The optical disc recording method according to the present invention is for recording a reproduction-dedicated information in a reproduction-dedicated area provided on an optical disc having a recording/reproduction area where a user data is recorded/reproduced as a modulated code based mon a predetermined modulation rule, wherein the reproduction-dedicated information is recorded as a code having a minimum run length longer than a minimum run length of the modulated code recorded/reproduced via the recording/reproduction area and having a channel bit length identical to that of the modulated code.

In the optical disc recording method according to the present invention, for example, a control information is recorded as the reproduction-dedicated information in the reproduction-dedicated area.

Moreover, in the optical disc recording method according to the present invention, for example, the reproduction-dedicated area is discretely arranged on the optical disc and an address information is recorded as the reproduction-dedicated information in the reproduction-dedicated area.

Furthermore, in the optical disc recording method according to the present invention, for example, a clock pattern identical to a clock pattern recorded/reproduced at a header portion of the recording/reproduction area is recorded at a header potion of the reproduction-dedicated area.

The optical disc access method according to the present invention is for an optical disc comprising a recording/reproduction area where a user data is recorded/reproduced as a modulated code based on a predetermined modulation rule and a reproduction-dedicated area where a control information has been recorded as a code having a minimum run length longer than a minimum run length of a modulated code recorded/reproduced via the recording/reproduction area and having a channel bit length identical to a channel bit length of the modulated code, the method comprising: a step of reproducing a reproduction-dedicated information form the reproduction-dedicated area; and a step of carrying out an access control of the recording/reproduction area according to a control information reproduced from the reproduction-dedicated area.

In the optical disc access method according to the present invention, an address information is reproduced as the control information from the reproduction-dedicated area discretely arranged on the optical disc, and an access control of the recording/reproduction area is executed according to the address information reproduced from the reproduction-dedicated area.

Moreover, in the optical disc access method according to the present invention, a clock pattern identical to a clock pattern recorded/reproduced at a header portion of the recording/reproduction area is reproduced from a header portion of the reproduction-dedicated area so as to create a clock.

The optical disc according to the present invention includes: a recording/reproduction area where a user data is recorded/reproduced as a modulated code based on a predetermined modulation rule and a reproduction-dedicated area where a reproduction-dedicated information has been recorded as a code having a minimum run length longer than a minimum run length of a modulated code recorded/ reproduced via the recording/reproduction area and having a channel bit length identical to a channel bit length of the modulated code.

The optical disc according to the present invention, for example, has a reproduction-dedicated area containing a control information recorded as the reproduction-dedicated information.

Moreover, in the optical disc according to the present invention, the reproduction-dedicated area containing an address information as the reproduction-dedicated information is discretely provided on a recording track.

Furthermore, in the optical disc according to the present invention, a clock pattern identical to a clock pattern recorded/reproduced at a header potion of the recording/reproduction area has been recorded at a header potion of the reproduction-dedicated area.

The optical disc recording apparatus according to the present invention includes: recording means for recording a reproduction-dedicated information in a reproduction-dedicated area provided on an optical disc having a recording/reproduction area where a user data is recorded/reproduced as a modulated code based on a predetermined modulation rule, the reproduction-dedicated information is recorded as a code having a minimum run length longer than a minimum run length of a modulated code recorded/reproduced via sthe recording/reproduction area and having a channel bit length identical to a channel bit length of the modulated code. In the optical disc recording apparatus according to the present invention, the recording means records a control information as the reproduction-dedicated information in the reproduction-dedicated area.

In the optical disc recording apparatus according to the present invention, the recording means arranges the reproduction-dedicated area discretely on the optical disc and records an address information as the reproduction-dedicated information in the reproduction-dedicated area.

Moreover, in the optical disc recording apparatus according to the present invention, the recording means records at a header portion of the reproduction-dedicated area, a clock pattern identical to a clock pattern recorded/reproduced at a header portion of the recording/reproduction area.

the optical disc apparatus according to the present invention is for an optical disc having a recording/reproduction area where a user data is recorded/reproduced as a modulated code based on a predetermined modulation rule and a reproduction-dedicated area where a reproduction-dedicated information has been recorded as a code having a minimum run length longer than a minimum run length of a modulated code recorded/reproduced via the recording/reproduction area and having a channel bit length identical to a channel bit length of the modulated code, the apparatus including: reproduction means for reproducing the reproduction-dedicated information from the reproduction-dedicated area; and control means for executing access control of the recording/reproduction area according to a control information reproduced from the reproduction-dedicated area.

In the optical disc apparatus according to the present invention, the reproduction means reproduces an address information as the control information from the reproduction-dedicated area discretely arranged on the optical disc; and the control means executes an access control of the recording/reproduction area according to an address information reproduced from the reproduction-dedicated area.

Moreover, in the optical disc apparatus according to the present invention, the reproduction means includes clock generation means for reproducing at a header portion of the reproduction-dedicated area a clock pattern identical to a clock pattern recorded/reproduced at a header portion of the recording/reproduction area so as to generate a clock.

DETAILED DESCRIPTION OF PREFERRED EMBODIMENTS

Hereinafter, description will be directed to a thin optical disc system according to an embodiment of the present invention with reference to the attached drawings.

In a thin optical disc system, it is preferable to provide a large errror processing (ECC: error check and correction) block size in order to cope with dusts and scars on the optical disc surface. Here, it is assumed that using an ECC block of a user data (64 KB) corresponding to an inner circumference of the disc and the RLL (1, 7) modulation having a wide channel detection window as the modulation method, a DCC code is added for controlling a DC component on DC control (DCC) cell basis.

Figure 1:
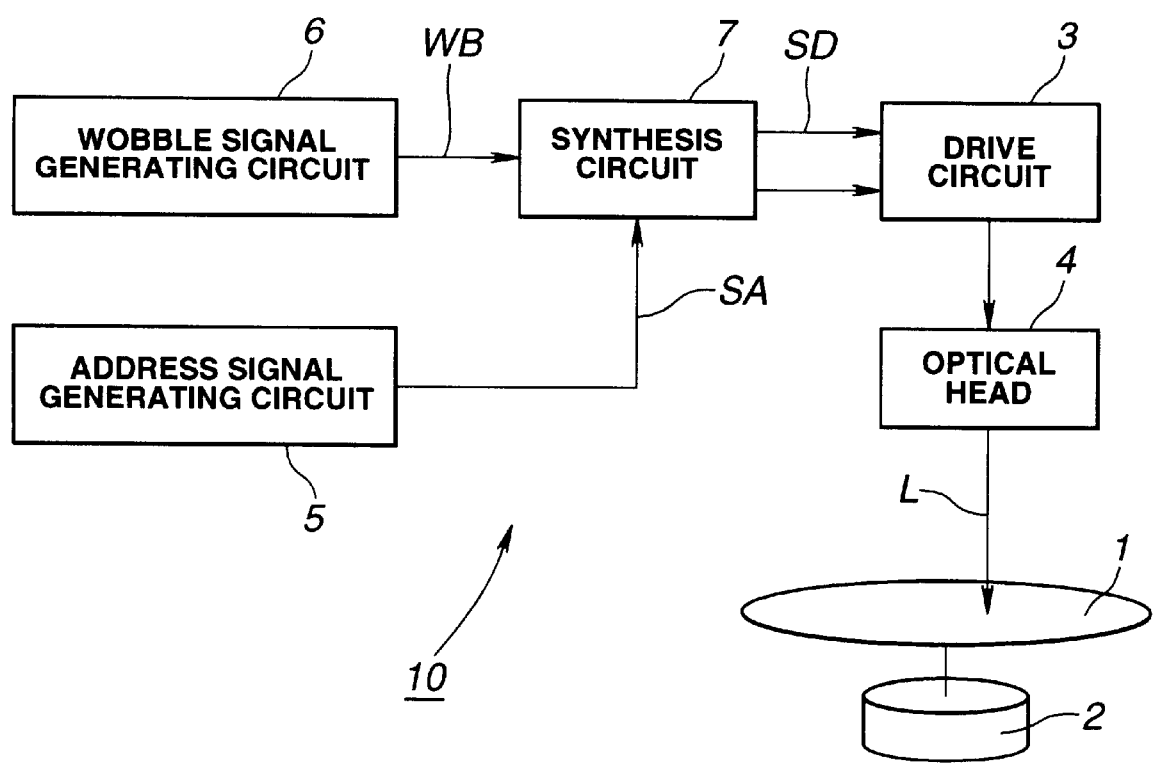
FIG. 1 is a block diagram showing a configuration of a mastering apparatus for preparing a master disc of an optical disc according to the present invention.

The optical disc according to the present invention is prepared by using a master disc 1 exposed by a mastering apparatus 10 having a configuration as shown in FIG. 1, for example.

This mastering apparatus 10 includes: a spindle motor 2 for rotating the master disc 1; a drive circuit 3; and an optical head 4 driven by the drive circuit 3 for applying a laser beam L onto the master disc 1. The drive circuit 3 drives the optical head 4 according to an address signal SA supplied from an address signal generation circuit 5, a wobble signal WB supplied from the wobble signal generating circuit 6, and a drive signal SD supplied from a synthesis circuit 7.

In this mastering apparatus 10, the master disc 1 is, for example, a glass substrate having a photoresist applied on its surface. This master disc 1 is rotated by the spindle motor 2 at a constant angular velocity. The optical head 4 applies the laser beam L onto the master disc 1 while being displaced from the inner circumference to the outer circumference of the master disc 1 in synchronization with the rotation of the master disc 1. This makes the optical head 4 form a spiral track from the inner circumference to the outer circumference of the master disc 1.

It should be noted that in the optical head 4, the laser beam L spot diameter is set so that a groove formed by exposure of the laser beam L and a land defined by adjacent grooves have an almost identical width. Here, the laser beam L spot configuration and light quantity aree set so that the actual exposure range by the laser beam L is enlarged for the groove width as a final target. This enables the optical head 4 carry out exposure of the master disc 1 in such a manner that an optical disc prepared by this master disc 1 is capable of recording between the land and the groove.

Furthermore, the optical head 4 is constructed so that the optical system can be moved in a radial direction of the master disc 1.

Figures 2A, 2B:
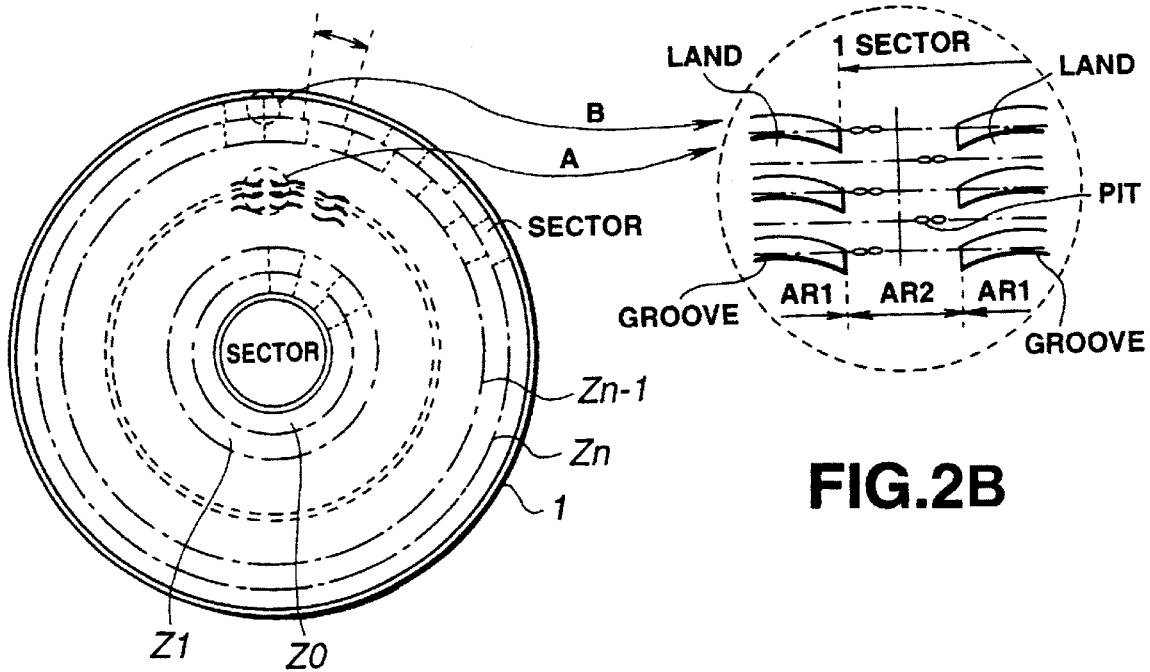
FIG. 2 is a plan view schematically showing a zoning process by the aforementioned mastering apparatus.

According to the drive signal SD supplied from the synthesis circuit 7, the drive circuit 3 for driving the optical head 4 switches the drive condition of the optical head 4 corresponding to the laser beam radiation position at a timing synchronized with the rotation of the master disc 1, so as to carry out zoning of the master disc 1 as shown in FIG. 2. It should be noted that in FIG. 2, the groove and pit are shown in a simplified form.

That is, the drive circuit 3 switches the drive condition of the optical head 4 so that the information recording plane has a sector configuration divided into sector areas. Furthermore, the timing of this switching is gradually changed from the inner circumference to the outer circumference so that the information recording plane is divided into coaxial zones Z0 to Zn.

Each of the sectors, as shown in an enlarged sector boundary indicated by the arrows A and B, has a head allocated in address area AR2 and a remaining area AR1 allocated as a user area. The address area AR2 is arranged on the optical disc in a discrete manner so as to record the sector unit address information.

The drive circuit 3 is controlled by a system control circuit (not depicted) so as to displaced the laser beam radiation position in the user area R1 using the drive signal SD, thus enabling to form a groove in a wobbled manner in the user area AR1.

As for the address area AR2, in a first half of the address area AR2, displacement of the laser beam radiation position is stopped and the laser beam light quantity is intermittently risen by the drive signal SD, thus forming a pit string by a groove on the track center. In the latter half of the address area AR2, the laser beam radiation position is displaced onto a track center by the land and the laser beam light quantity is intermittently risen by the drive signal SD, thus forming a pit string by the land on the track center.

That is, the drive circuit 3 records an address data of a following groove sector with a pit string on the track center in the first half of the address area AR2, and an address data of a following land sector of an inner circumference with a pit string on the track center in the latter half of the address area AR2.

The wobble signal generating circuit 6 outputs as a wobble signal WB a sinusoidal wave signal of a predetermined frequency synchronized with the rotation of the master disc 1. Here, the wobble signal generating circuit 6 gradually increases the frequency of the wobble signal WB according to the aforementioned zoning. Thus, the wobble signal generating circuit 6 with the wobble signal WB displaces the laser beam radiation position so as to wobble a groove for a predetermined period per sector.

That is, in the address area (header area) AR2, a length equivalent to a predetermined period of groove is allocated. In the innermost track of zone Z0, the groove is formed while being wobbled for a predetermined period, and as advnacing toward the zone of the outer circumference, the number of groove wobbles is gradually increased.

The address signal generating circuit 5 is controlled by the system control circuit so as to generate an address signal SA that changes its value according to the displacement of the optical head 4. That is, the address signal generating circuit 5 receives from the spindle motor 2 or the like a timing signal (FG signal and the like synchronized with the rotation of the master disc 1 and counts this timing signal by a predetermined counter so as to create an address data ID of the laser beam radiation position.

Figure 3:
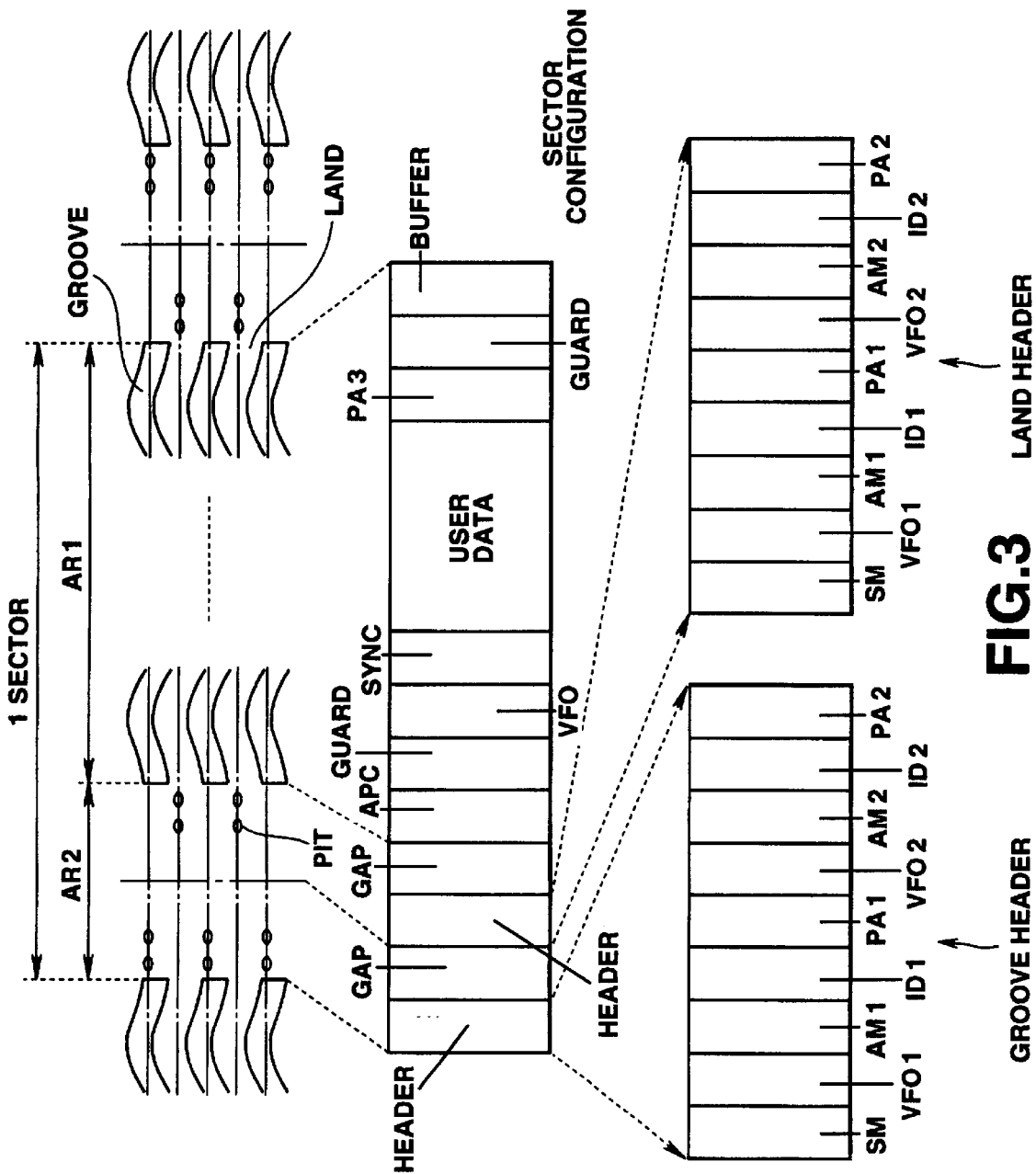
FIG. 3 schematically shows a configuration of a sector in the optical disc according to the present invention.

As shown in FIG. 3, this address signal generating circuit 5 adds to the address data ID a sector mark SM, a synchronization timing data VFO, an address mark AM, and a post-amble PA, so as to create a groove header and a land header to be allocated in the first half and the latter half of the address area R2. As the synchronization timing data VFO, a clock pattern is created to be identical to the clock pattern recorded/reproduced as the synchronization timing data VFO at the header portion of the user area AR1.

The address mark AM is an address synchronization signal. As for the address data ID, the same data is recorded repeatedly twice, so as to enhance the reliability. The post-amble PA is arranged so as to set a signal polarity.

The sector header thus created is converted by the address signal generating circuit 5 into a serial data string, which is modulated with a predetermined format. Furthermore, the address signal generating circuit 5 supplies this modulated output as the address signal SA to the synthesis circuit 7. Here, the address signal generating circuit 5 outputs this address signal SA at a timing corresponding to scanning of the laser beam L.

The address signal generating circuit 5 in this mastering apparatus 10 modulates the serial data string to create an address signal SA as a code having a minimum run length longer than the minimum run length of a modulation code based on the modulation rule of a user data recording/reproduced via the user area AR1 and having a channel bit length identical to the aforementioned modulation code.

More specifically, for example, The RLL (1, 7) code is used for the modulation method of a user data recorded/reproduced via the user area AR1, whereas the RLL (2, 7) code having a channel bit length identical to that of the RLL (1, 7) is used for the modulation method of the address signal SA to be recorded in advance in the address area AR2.

When the RLL (1, 7) code is used as the modulation method in the user area AR1 to carry out NRZI conversion for recording, if the channel bit length is 11$b$, the shorter pit length is 21$b$. On the other hand, when the RLL (2, 7) code is used as the modulation method in the address area AR2, if the channel bit length is 11$b$, the shortet pit length is 31$b$. That is, the shortest pit length in the address area AR2 is 1.5 of the shortest pit length in the user area AR1.

The synthesis circuit 7 synthesizes this wobble signal WB and the address signal SA so as to create a drive signal SD consisting of a displacement signal for displacing the optical system of the optical head 4 and a light quantity control signal for controlling the laser beam L light quantity, and supplies this drive signal SD to the drive circuit 3.

Thus, the optical disc prepared from the master disc 1 has an information recording plane into coaxial sectors preformatted in such a manner that the number of sectors increases from the inner circumference to the outer circumference. Furthermore, at the head of each sector is formed an address area AR2. An address of a following groove sector and address of a following land sector are recorded are recorded in this address area AR2, which is followed by a user area AR1 where a desired data is recorded.

It should be noted that the master disc 1 is provided with a gap and a guard. The gap serves as a switching area between a land and a groove and a laser beam light quantity switching area. The guard is arranged to suppress flow of the recording material by overwrite and enhance the recording area overwrite cycle when the recording medium used is a phase change medium.

In this mastering apparatus 10, when the address signal generating circuit 5 modulates a serial data string to create an address signal SA, the modulation is carried out to obtain a code having a minimum run length longer than the minimum run length of a code modulated according to the modulation rule of a uaser data recorded/reproduced via the user area AR1 and having a channel bit length identical to that of the modulated code, so that the shortest pit length in the address area AR2 is increased, enabling to form a high-quality pit.

It should be noted that when employing a magnetic field modulation magneto-optical recording method, if the line density is increased so that a signal level of the minimum run length approaches 0 for detecting with a most likelihood decoding, it is possible to further increase the minimum pit length by using a code having a d limit equal to or more than 3 in the address area AR2.

Here, in this mastering apparatus 10, the address signal generating circuit 5 that generates an address signal SA to be recorded in advance in the production-dedicated address area AR2 carries out a modulation to obtain a code having a minimum run length longer than the minimum run length of a code modulated according tot he modulation rule of a user data recorded/reproduced via the user area AR1 and having a channel bit length identical to that of the aforementioned modulated code. By employing such a modulation method in means for creating a data to be recorded as a pre-pit in a reproduction-dedicated read-in area and read-out area, it is possible to form a high-quality pit. Furthermore, when preparing a so-called hybrid disc in which some of a plurality of zones are used as reproduction-dedicated areas, the aforementioned method can be employed in means for creating a data to be recorded in advance in the reproduction-dedicated zones, so as to form a high-quality pit.

Figure 4A:
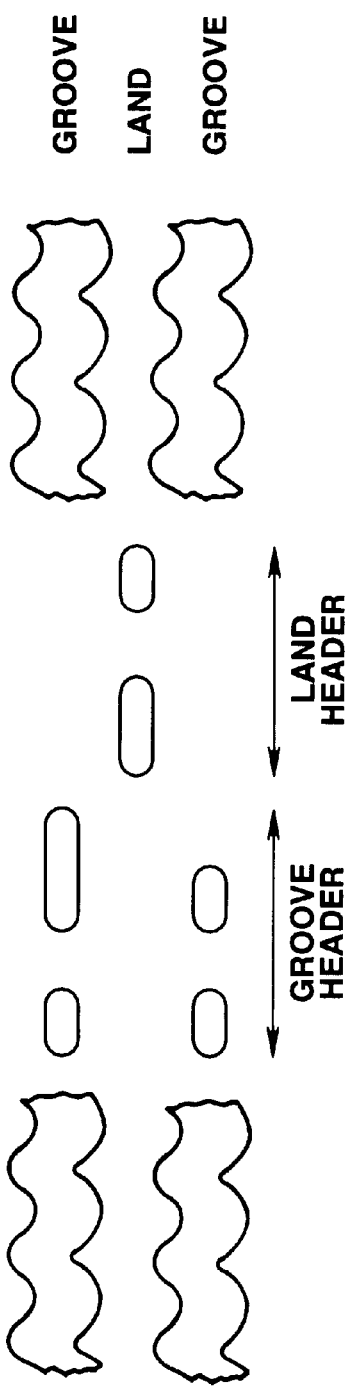
FIG. 4 is a plan view schematically showing a record pattern in the vicinity of the address area of each zone in a hybrid disc.
Figure 4B:
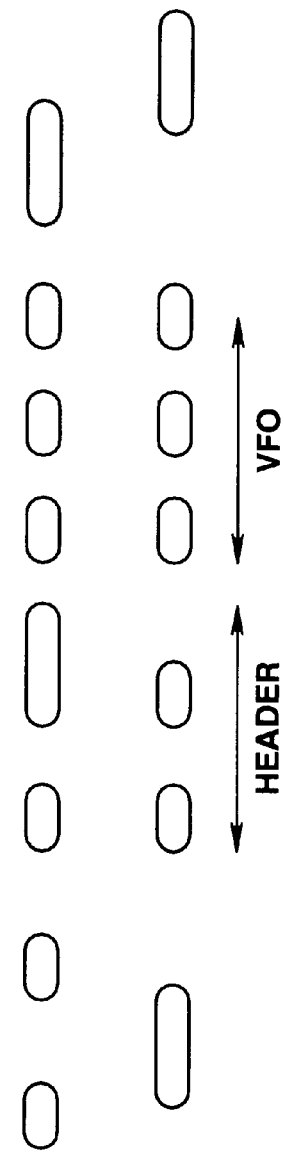
Figure 4C:
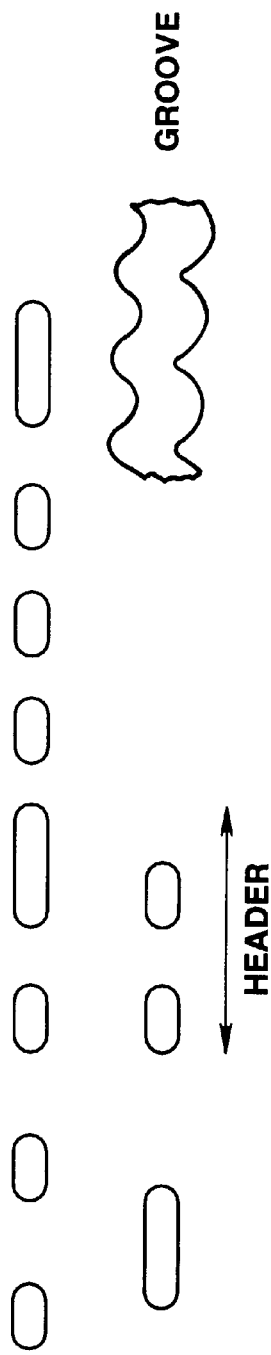

FIG. 4A shows a record pattern in the vicinity of the address area in the recording/reproduction zone in a hybrid disc. Moreover, FIG. 4B shows a record patter in the vicinity of the address area in a reproduction-dedicated area. Furthermore, FIG. 4C shows a record pattern in the vicinity of the address area between a recording/reproduction zone and a reproduction-dedicated zone.

Moreover, in an optical disc prepared using the master disc 1 exposed by the mastering apparatus 10, the modulation method of a user data recorded/reproduced via the user area is the RLL (1, 7) modulation, and the modulation method of an address data recorded in the address area is the RLL (2, 7) modulation having a channel bit length identical to that of the RLL (1, 7). Accordingly, it is possible to employ the same PLL configuration for generating a clock signal from a reproduction RF signal in the user data reproduction system and in the address data reproduction system in the optical disc recording/reproduction apparatus for recording/reproducing a user data via the user area of the optical disc. For example, in a reproduction sysem 20 show in FIG. 5, the clock generation means can have a simplified configuration so that clock generation can be carried out by a single clock generation circuit.

Figure 5:
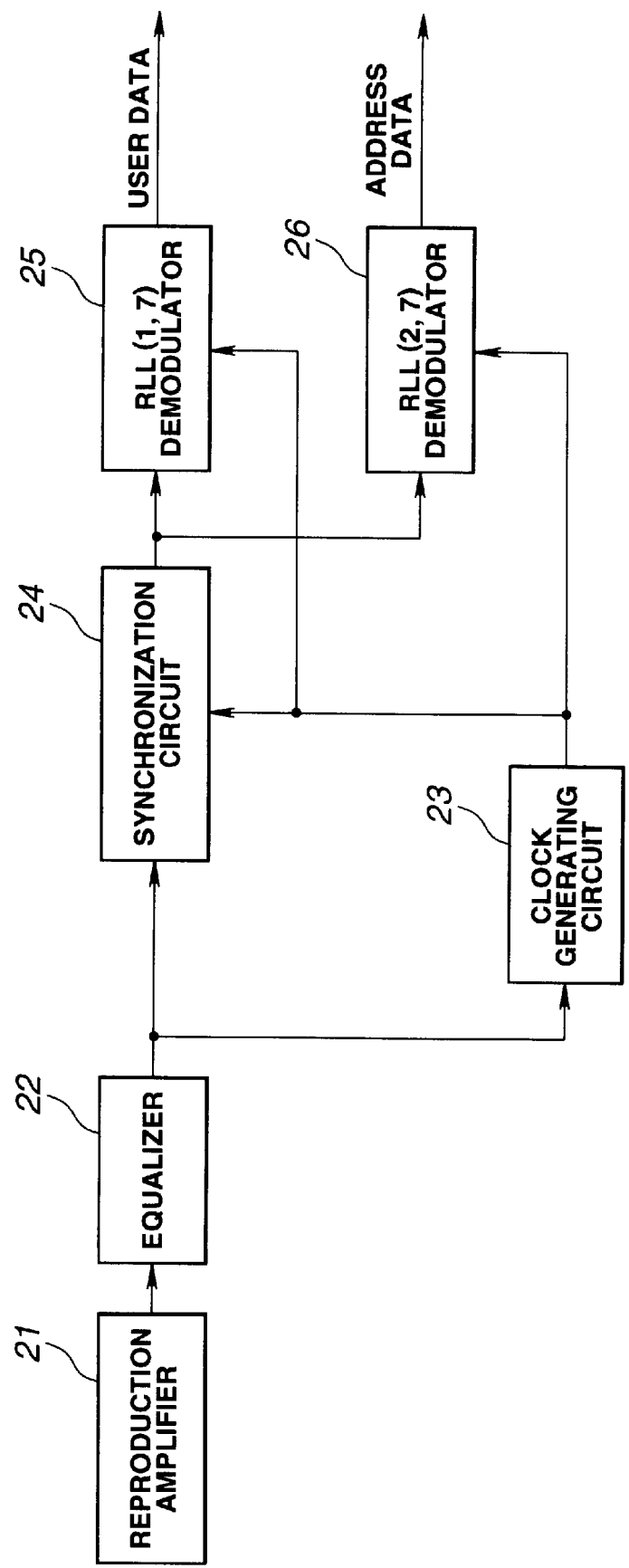
FIG. 5 is a block diagram showing a configuration of an essential portion of a reproduction system of an optical disc according to the present invention.

In the reproduction system shown in FIG. 5, there is provided a clock generation circuit 23 supplied via a equalizer 22 with a reproduction RF signal reproduced by an optical head is subjected to a gain adjustment by a reproduction amplifier 21, and the reproduction RF signal is supplied from an equalizer 22 via a synchronization circuit 24 to an RLL (1, 7) demodulator 25 and an RLL (2, 7) demodulator 26.

The clock generation circuit 23 extracts a synchronization clock by a PLL synchronization circuit from the reproduction RF signal which has been subjected to a waveform equalization by the equalizer 22, and generates a clock signal. This clock generation circuit 23 supplies the generated clock signal to the synchronization circuit 24, the RLL (1, 7) demodulator 25 and the RLL (2, 7) demodulator 26. This clock generation circuit 23 carries out a clock generation by reproducing from a VFO in the aforementioned address area a clock pattern identical to the clock pattern recorded/reproduced as a VFO of the aforementioned user area. Accordingly, it is possible to reduce the PLL pull-in time.

The synchronization circuit 24, according to the clock signal supplied from the clock generation circuit 23, converts the reproduction RF signal waveform-equalized by the equalizer 22, for supply to the RLL (1, 7) demodulator 25 and the RLL (2, 7) demodulator 26.

The RLL (1, 7) demodulator 25 carries out the RLL (1, 7) demodulation to a channel bit string supplied from the synchronization circuit 24 so as to reproduce the user data. Moreover, the RLL (2, 7) demodulator 26 carries out the RLL (2, 7) demodulation to a channel bit string supplied from the synchronization circuit 24 so as to reproduce the address data.

In an optical disc prepared by using the master disc 1 exposed by the mastering apparatus 10, a user data is recorded/reproduced, for example, by using an optical disc recording/reproducing apparatus having a configuration as follow.

Figure 6:
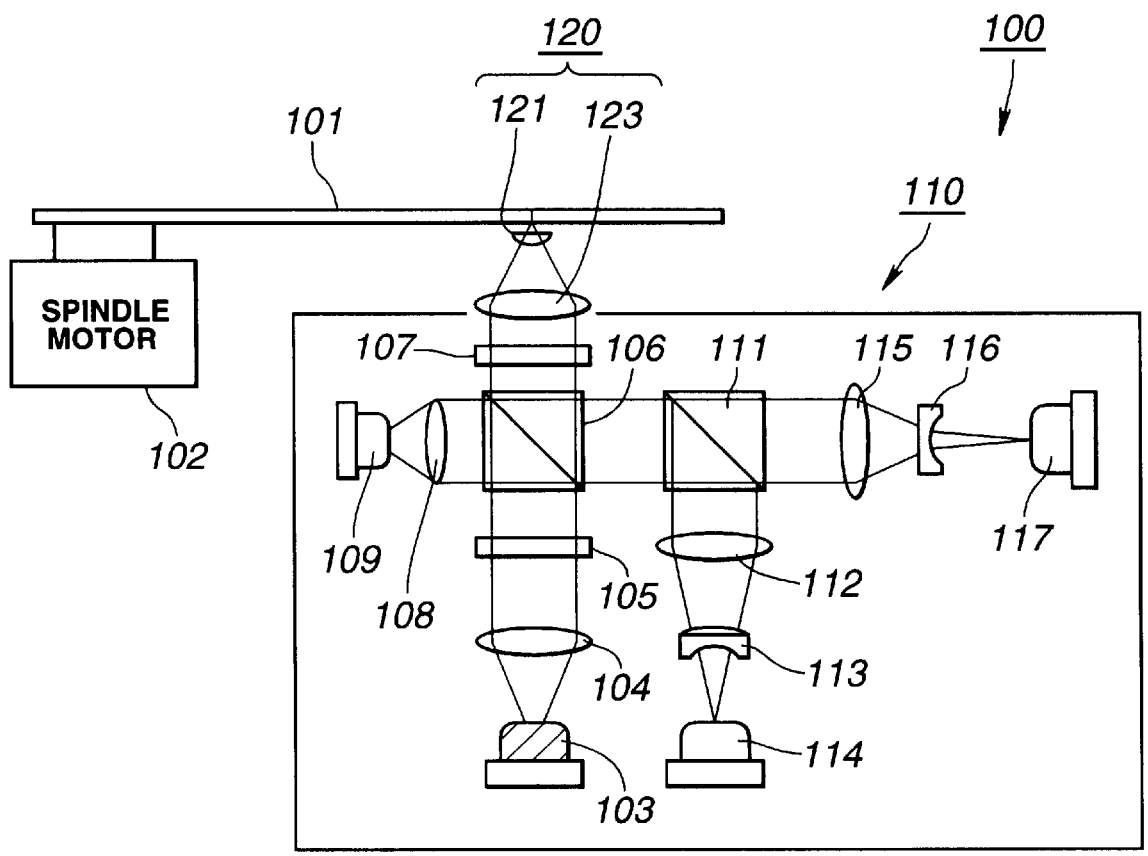
FIG. 6 is a block diagram showing a configuration of a disc drive of an optical disc recording/reproducing apparatus for recording/reproducing a user data onto/from the optical disc according to the present invention.

This optical recording/reproducing apparatus includes a disc drive 100 having a configuration as shown in FIG. 6, wherein an optical disc 101 is rotated by a spindle motor 102 at a constant angular velocity, for example, while an optical head 110 scans with a laser beam an information recording plane of the optical disc 101 so as to optically record/reproduce an information.

This disc drive 100 has an optical head 110 having a semiconductor laser )LD 103 as a light source for emitting a recording/reproducing laser beam to be applied to the optical disc 101. The light emitted from this semiconductor laser 103 is made into a parallel beam by a collimator lens 104 before passing a diffraction grating 105 for size spot generation to be introduced via a beam splitter 106 and a ¼ wavelength plate 107 to an aspheric two-objective lens unit 120. This aspheric two-objective lens unit 120 focuses the beam on an information recording plane of the optical disc 101. A part of the light from the semiconductor laser 103 is reflected by the beam splitter 106 and introduced via a converging lens 108 to a light emitting power monitor detector 109 for use in automatic power control (APC) for controlling the laser power on the information recording plane. The reflected light (i.e., reproduction signal) from the optical disc 101 is reflected by the beam splitter 106 and introduced to a detection optical path. A part of it is reflected by the beam splitter 111 and introduced via a converging lens 112 and a cylindrical lens 113 to a servo signal detector 114, so as to be subjected to optical-electric conversion, and the rest is introduced via lenses 115 and 116 to an RF signal detector 117 so as to be subjected to optical-electric conversion. In this optical head 110, the astigmatic method is used for generating a focus error signal, and the differential push-pull method is used to generate a tracking error signal.

Here two signal detectors 114 and 117 are used to detect a servo error signal and a reproduction RF signal. However, it is also possible to use a single detector for detection of the signals.

Figure 7:
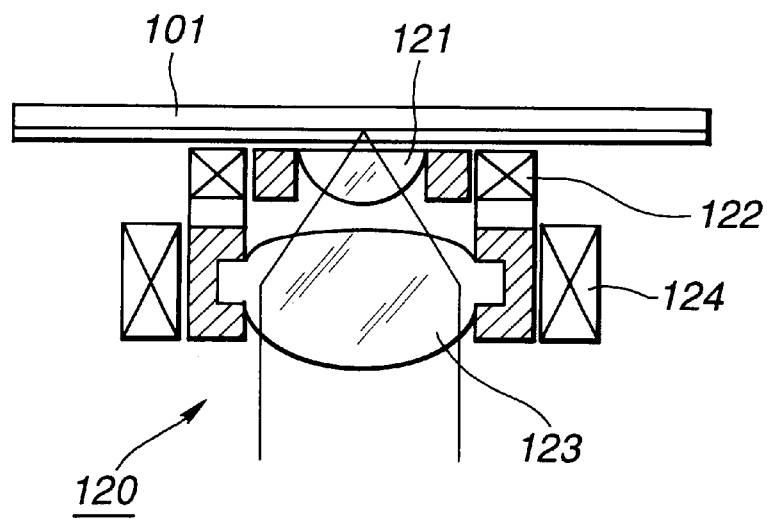
FIG. 7 is a cross sectional view schematically showing a configuration of an essential portion of an aspheric two-objective lens unit provided in an optical head of the aforementioned disc drive.

The aspheric two-objective lens unit 120, as shown in FIG. 7 for example, includes a first electromagnetic actuator 122 for driving a first lens 121 and a second actuator 124 for driving a second lens 123. The second lens 123 has a numerical aperture of about 0.5 and is mounted on the second electromagnetic actuator 124 that can move in an optical axis direction and in a track direction. Moreover, the first lens 121 is located above the second lens 123 and mounted on the first electromagnetic actuator 122 so as to be controlled at any position on the optical axis.

It should be noted that the first lens 121 moves together with the second lens 123 in the track direction for tracking servo. The laser beam from the semiconductor laser 103 passes through these two objective lenses 123 and 121 so as to be focused on a phase change type information recording plane of the optical disc 1. Here, the effective numerical aperture of the two lenses 123 and 121 is about 0.85.

If the numerical aperture of the objective lens is increased, generally the skew tolerance in the optical disc recording/reproducing apparatus is decreased. If the wave plane aberration is expressed by Seidel's polynominal, the following can be obtained:

$$W(x, y) = W_{22} x^2 + W_{31} x (x^2 + y^2) + W_{51} x (x^2 + y^2)^2$$

wherein $W_{22}$, is an astigmatic aberration, $W_{31}$ is a 3-dimensional coma aberration, and $W_{51}$ is 5-dimensional coma aberration. Among these, the most decisive is the 3-dimensional coma aberration $W_{31}$, which is given by a following expression, assuming n as a refractive index of the disc substrate, and is approximately proportional to a cube of the numerical aperture NA and to the disc substrate thickness t if the skew angle θ is equal to or smaller than 1 degree.

$$W_{31} = (n^2 - 1) n^2 \sin\theta \cos\theta / 2(n^2 - \sin\theta)^{2/5} \cdot tNA^3 \lambda$$

Consequently, in the optical disc recording/reproducing apparatus using an aspheric two-lens unit having the numerical aperture enhanced to 0.85, in order to assure a skew tolerance equivalent to a DVD-RAM, it is necessary that the substrate thickness be as thin as 0.1 mm.

Figure 8:
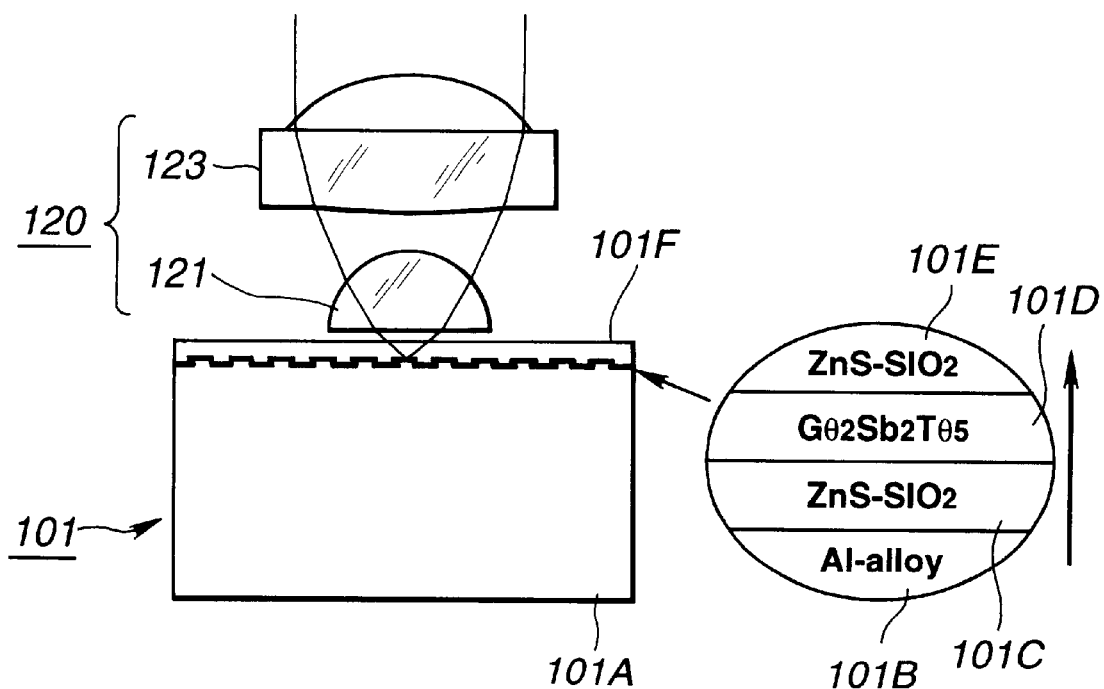
FIG. 8 is a cross sectional view schematically showing a configuration of an optical disc used in the aforementioned optical disc recording/reproducing apparatus.

On the other hand, when forming a film of a phase change type recording medium on a disc substrate, film formation is normally carried out in the order of a first dielectric film (ZnX—$SiO_2$), a recording film ($Ge_2Sb_2Te_5$), a second dielectric film (ZnS—$SiO_2$), and a aluminium alloy reflection film. However, it is difficult to emboss a pre-format such as an address and a sector mark on the substrate having a thickness of 0.1 mm and carry out film formation in the aforementioned order. Therefore, as shown in FIG. 8, the optical disc 101 used in the optical disc recording/reproducing apparatus is prepared as follows. That is, on a pre-formatted disc substrate 101A having a thickness of 1.2 mm, film formation is carried out in the reverse order: an aluminium alloy reflection film 101B, a second dielectric film (ZnS—$SiO_2$) 101C, a recording film ($Ge_2Sb_2Te_5$) 101D, and a first dielectric film (ZnS—$SiO_2$) 101E, after which a disc protection film 1F having a thickness of 0.1 mm is added.

Figure 9:
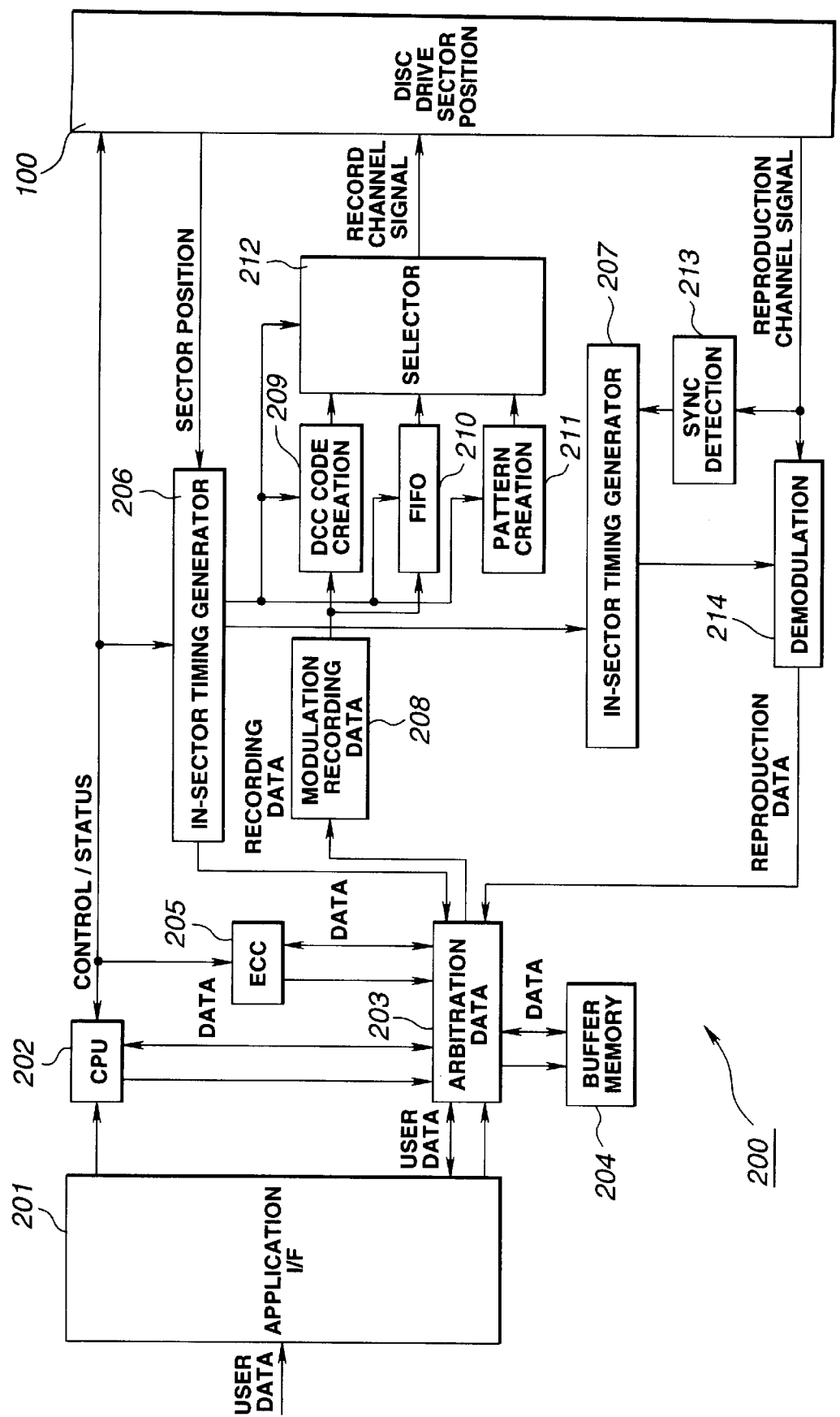
FIG. 9 is a block diagram showing a recording/reproduction processing in the optical disc recording/reproducing apparatus.

This optical disc recording/reproducing apparatus includes a recording/reproduction block 200 as shown in FIG. 9 connected to a disc drive 100 for causing the optical head 110 to scan an information recording plane of the optical disc 101 so as to carry out recording/reproduction.

This recording/reproduction block 200 has a computer (CPU: central processing unit) 202 for passing a user data and a control data via an application interface circuit 201 to/from a application side; and an arbitration block 203. The arbitration block 203 is connected to a buffer memory 204 and an ECC processing block 205 as well as to an in-sector timing generator 206 and a reproduction timing generator 207.

Moreover, this recording/reproduction block 200 includes: a modulation block 208 which is supplied with a record data from the arbitration block 203; and a DCC code creation block 209, FIFO 210, a pattern generation block 211, and a selector block 212 which operate according to a timing signal given from the in-sector timing generator 206. The modulation block 208 carries out a modulation processing according to the RLL (1, 7) modulation rule to a record data supplied from the arbitration block 203, and outputs the modulated data to the DCC code creation block 209 and the FIFO 210. Moreover, the pattern generation block 211 generates APC, VFO, SS, and PO patterns. The selector block 212, according to the timing signal given from the in-sector timing generator 206, selects outputs from the DCC code creation block 209, the FIFO 210, and the pattern generation block 211, so as to create a record channel signal for supply to the disc drive 100.

Here, the in-sector timing generator 206 obtains an address information by modulation by way of RLL (2, 7) the reproduction signal of the address area (header area) AR2 of the optical disc 101 supplied from the disc drive, and supplies this address information and a sector position information to the CPU 202. Moreover, this in-sector timing generator 206, according to the sector position information, generates timing signals in the sector and during a recording, carries out operation control of the DCC code generation block 209, the FIFO 210, the pattern generation block 211, and the selector block 212, and during a reproduction, supplies a reference timing signal to the reproduction timing generator 207. The CPU 202 carries out an access control for recording/reproducing a user data according the control data supplied from the application side and the sector position information supplied from the in-sector timing generator 206.

Furthermore, this recording/reproduction block 200 includes a sync detection block 213 and a demodulation block 214 which are supplied with a reproduction channel signal from the disc drive 100 during a reproduction. The sync detection block 213 detects a sync signal contained in the reproduction channel signal and supplies it to the reproduction timing generator 207. The demodulation block 214, according to the timing signal supplied from the reproduction timing generator 207, carries out the RLL (1, 7) demodulation corresponding to the RLL (1, 7) modulation by the modulation block 208, to the reproduction channel signal, so as to create a reproduction data for supply to the arbitration block 203.

n the recording/reproduction block 200 having the aforementioned configuration, during a recording, a user data is fed from the application side to the buffer memory 204; an ID information and a reserve data is fed from the CPU 202; the ECC processing block 205 creates and IDE and EDC; and an ECC encoding is carried out, so that a data in the ECC block is prepared in the buffer memory 204. The ECC block data prepared in the buffer memory 204 is subjected to the RLL (1, 7) modulation by the modulation block 208 at a timing of a sector to be recorded that is indicated by a timing signal from the in-sector timing generator 206. The demodulated data is added via the selector block 212, with a DCC code created by the DCC code creation block 209, and further added with the APC, VFO, SS, and PO patterns created by the pattern generation block 211, so as to be a record channel signal, which is fed to the disc drive 100 so as to be recorded in the user area of the optical disc.

Here, the DCC code is created from a channel string of preceding and following DCC cells, and the FIFO 209 is used for timing matching between the channel string and the DCC code. In stead of the FIFO 209, it is also possible to use a shift register. In the arbitration block 203, address signals for buffer memory created by respective blocks are subjected to arbitration, so that data arrangement is changed.

Moreover, during a reproduction, the sync detection block 213 detects a sync signal from the reproduction channel signal reproduced, and supplies the sync signal to the reproduction timing generator 207 for sync protection. According to the timing, the demodulation block 214 executes the RLL (1, 7) demodulation and supplies the reproduction data to the buffer memory 204. In the ECC processing block 205, ECC decoding is carried out and EDC check is executed. Furthermore, IDE check is carried out. Thus, the reproduction data which has been subjected to the ECC processing is stored as a user data in the buffer memory 204. Here, if necessary, te CPU 202 fetches an ID and a reserve data. The user data in the buffer memory is fed to the application side.

It should be noted that the EDC creation and check may be carried out by the application interface block 201 instead of the ECC processing block 205.

According to the present invention, in a reproduction-dedicated area provided on an optical dis having a recording/reproduction area where a user data is recorded/reproduced as a modulated code based on a predetermined modulation rule, a reproduction-dedicated information is recorded as a code having a minimum run length longer than a minimum run length of a modulation code recorded/reproduced via the recording/reproduction area and having an identical channel bit length as that of the modulation code. Accordingly, it is possible to increase the minimum pit length of a code recorded in the reproduction-dedicated area and to form a high-quality pit in the reproduction-dedicated area. Consequently, it is possible to carry out cutting of a master of an optical disc with a high yield.

Moreover, according to the present invention, the recording/reproduction area and the reproduction-dedicated area on the optical disc use codes having an identical channel bit length. Accordingly, it is possible to supply a common clock information. Consequently, clock reproduction means for clock reproduction in an optical disc reproduction system can be constituted by a single PLL circuit, enabling to simplify the configuration of the clock reproduction means. Moreover, clock generation is carried out by reproducing a clock pattern identical to the clock pattern recorded/reproduced at the header portion of the recording/reproduction area, at the header portion of the reproduction-dedicated area. This enables to reduce the PLL pull-in time at clock generation.

What is claimed is:

1. An optical disc recording method for recording user data as a modulated code based upon a predetermined modulation rule in a recording/reproduction area of an optical disc, comprising the steps of:

providing a reproduction-dedicated area on said optical disc; and recording reproducing-dedicated information in said reproduction-dedicated area as a code having a minimum run length longer than a minimum run length of the modulated code recorded in, and reproducible from, said recording/reproduction area and having a channel bit length identical to that of said modulated code.

2. The optical disc recording method as claimed in claim 1, wherein control information is recorded as said reproducing-dedicated information in said reproduction-dedicated area.

3. The optical disc recording method as claimed in claim 1, wherein a position of said reproduction-dedicated area is discretely arranged on said optical disc and address information is recorded as said reproducing-dedicated information in said reproduction dedicated area.

4. The optical disc recording method as claimed in claim 3, wherein a clock pattern identical to a clock pattern recorded at, and reproducible from, a header portion of said recording/reproduction area is recorded at a header portion of said reproduction-dedicated area.

5. An optical disc access method for an optical disc having a recording/reproduction area, in which user data is recorded as a modulated code based on a predetermined modulation rule, and a reproduction-dedicated area in which control information is recorded as a code having a minimum run length longer than a minimum run length of said modulated code recorded in, and reproducible from, said recording/reproduction area and having a channel bit length identical to a channel bit length of said modulated code, comprising the steps of:

reproducing reproduction-dedicated information from said reproduction-dedicated area; and controlling access to said recording/reproduction area according to control information reproduced from said reproduction-dedicated area as part of said reproduction-dedicated information.

6. The optical disc access method as claimed in claim 5, wherein said reproduction-dedicated area is discretely arranged on said optical disc, and address information is reproduced as said control information from said reproduction-dedicated area, and access to said recording/reproduction area is controlled according to said address information.

7. The optical disc access method as claimed in claim 6, wherein a clock pattern identical to a clock pattern recorded in, and reproducible from, a header portion of said recording/reproduction area is reproduced from a header portion of said reproduction-dedicated area so as to create a clock.

8. An optical disc comprising:

a recording/reproduction area in which user data is recorded as a modulated code based on a predetermined modulation rule; and a reproduction-dedicated area in which reproduction-dedicated information is recorded as a code having a minimum run length longer than a minimum run length of said modulated code and having a channel bit length identical to a channel bit length of said modulated code.

9. The optical disc as claimed in claim 8, wherein control information is recorded as said reproduction-dedicated information.

10. The optical disc as claimed in claim 9, wherein address information is recorded as said reproduction-dedicated information at a discrete position on a recording track of said optical disc.

11. The optical disc as claimed in claim 10, wherein a clock pattern identical to a clock pattern recorded at, and reproducible from, a header portion of said recording/ reproduction area is recorded at a header portion of said reproduction-dedicated area.

12. An optical disc recording apparatus for use with an optical disc having a recording/reproduction area, in which user data is recorded as a modulated code based on a predetermined modulation rule, and a reproduction-dedicated area, said apparatus including a recorder for recording reproduction-dedicated information in said reproduction-dedicated area on said optical disc as a code having a minimum run length longer than a minimum run length of said modulated code recorded in said recording/ reproduction area and having a channel bit length identical to a channel bit length of said modulated code.

13. The optical disc recording apparatus as claimed in claim 12, wherein said recorder records control information as said reproduction-dedicated information in said reproduction-dedicated area.

14. The optical disc recording apparatus as claimed in claim 12, wherein said recorder records said reproduction-dedicated area at a discrete position on said optical disc and records address information as said reproduction-dedicated information in said reproduction-dedicated area.

15. The optical disc recording apparatus as claimed in claim 14, wherein said recorder records at a header portion of said reproduction-dedicated area, a clock pattern identical to a clock pattern recorded in a header portion of said recording/reproduction area.

16. An optical disc apparatus for recording information on, and reproducing information from, an optical disc having a recording/reproduction area, in which user data is recorded and reproduced as a modulated code based on a predetermined modulation rule; and a reproduction-dedicated area in which reproduction-dedicated information is recorded as a code having a minimum run length longer than a minimum run length of said modulated code and having a channel bit length identical to a channel bit length of said modulated code, said apparatus comprising:

reproduction means for reproducing said reproduction-dedicated information from said reproduction-dedicated area; and control means for controlling control to said recording/ reproduction area according to control information reproduced from said reproduction-dedicated area.

17. The optical disc apparatus as claimed in claim 16 wherein said reproduction-dedicated area is arranged at a discrete position on said optical disc; and wherein said reproduction means reproduces address information as said control information from said reproduction-dedicated area, and said control means controls access to said recording/ reproduction area according to said address information.

18. The optical disc apparatus as claimed in claim 17, wherein said reproduction means includes clock generation means for reproducing at a header portion of said reproduction-dedicated area a clock pattern identical to a clock pattern recorded in, and reproducible from, a header portion of said recording/reproduction area so as to generate a clock signal.

* * * * *